(12) United States Patent
Salsamendi

(10) Patent No.: US 9,208,307 B2
(45) Date of Patent: Dec. 8, 2015

(54) AUTOMATIC ALGORITHM DISCOVERY USING REVERSE DATAFLOW ANALYSIS

(71) Applicant: RAYTHEON COMPANY, Waltham, MA (US)

(72) Inventor: Ryan Salsamendi, Sunnyvale, CA (US)

(73) Assignee: RAYTHEON COMPANY, Waltham, MA (US)

( * ) Notice: Subject to any disclaimer, the term of this patent is extended or adjusted under 35 U.S.C. 154(b) by 196 days.

(21) Appl. No.: 13/962,829

(22) Filed: Aug. 8, 2013

(65) Prior Publication Data
US 2015/0047045 A1    Feb. 12, 2015

(51) Int. Cl.
G06F 11/00 (2006.01)
G06F 21/50 (2013.01)
G06F 11/36 (2006.01)
G06F 21/52 (2013.01)

(52) U.S. Cl.
CPC ............ *G06F 21/50* (2013.01); *G06F 11/3636* (2013.01); *G06F 21/52* (2013.01)

(58) Field of Classification Search
CPC ............................ G06F 21/577; H04L 63/145
USPC ..................................................... 726/22–25
See application file for complete search history.

(56) References Cited

U.S. PATENT DOCUMENTS 8,136,096 B1    3/2012  Lindahl et al.
8,745,734 B1 *  6/2014  Brandwine et al. .............. 726/22
8,918,785 B1 * 12/2014  Brandwine et al. ............... 718/1

OTHER PUBLICATIONS

Brook, et al., "Reversible Debugging", Proceedings of the GCC Developer's Summit, Jul. 20, 2007 (pp. 69-76).
King, et al., "Debugging Operating Systems With Time-Traveling Virtual Machines", USENIX, Mar. 14, 2005 (pp. 1-15).
Written Opinion of the International Searching Authority for International Application No. PCT/US2014/041412 filed Jun. 6, 2014, Written Opinion of the International Searching Authority mailed Oct. 6, 2014 (6 pp.).
International Search Report for International Application No. PCT/US2014/041412 filed Jun. 6, 2014, International Search Report dated Sep. 26, 2014 and mailed Oct. 6, 2014 (4 pp.).
http://bitblaze.cs.berkeley.edu/temu.html, "TEMU: The BitBlaze Dynamic Analysis Component," 1 page, May 1, 2014.
http://software.intel.com/en-us/articles/pintool, "Pin—A Dynamic Binary Instrumentation Tool," 3 pages, May 1, 2014.

(Continued)

*Primary Examiner* — Anthony Brown
(74) *Attorney, Agent, or Firm* — Christie, Parker & Hale, LLP

(57) ABSTRACT

A system and method for finding vulnerabilities and tracing an end result associated with a vulnerability to its origins in user data. A user data source containing an ordered sequence of user data items may be a data file. In one embodiment the method for identifying, in the user data source, the origins of the end result, includes associating with each user data item a location identifier identifying the location of the user data item in the sequence of user data items executing instructions with a virtual machine, associating with each result the location identifier of the data item when one argument is a user data item and a tag when more than one argument is a user data item. This process may be continued until the end result is obtained. Subsequently, the method may include stepping through instructions with the virtual machine in reverse order, to tracing the origins of the end result to each of the user data items contributing to the result.

16 Claims, 2 Drawing Sheets

(56) References Cited

OTHER PUBLICATIONS

Newsome et al., "Dynamic Taint Analysis for Automatic Detection, Analysis, and Signature Generation of Exploits on Commodity Software," Carnegie Mellon University, 17 pages, 2005.

Schwartz et al., "All You Ever Wanted to Know About Dynamic Taint Analysis and Forward Symbolic Execution (but might have been afraid to ask)," IEEE Symposium on Security and Privacy, 15 pages, 2010.

* cited by examiner

AUTOMATIC ALGORITHM DISCOVERY USING REVERSE DATAFLOW ANALYSIS

BACKGROUND

1. Field

One or more aspects of embodiments according to the present invention relate to detection and exploitation of vulnerabilities in computer programs.

2. Description of Related Art

Common computer programs are in many cases designed to accept as input user data, such as user data files, and process the input to generate output. In many cases the program is not designed to interpret user data as an instruction for, e.g., execution by a computer's microprocessor. Nonetheless, imperfections in a program may on occasion result in user data being executed, especially when the user input is unusual in some way.

When a program that is designed not to execute user data nonetheless executes user data, the behavior may be referred to as a vulnerability. The exploitation of a vulnerability may allow a supplier of user data to take control of a computer running the program with the vulnerability.

Exploitation of vulnerabilities may have various uses, including for example use by law enforcement to gather information or evidence remotely, by taking control of suspects' computers. Thus, there is a need for a systematic approach to finding vulnerabilities, and finding ways to exploit them. A maker or a user of a computer program may also desire to find vulnerabilities in the program in order to understand and prevent their exploitation.

SUMMARY

When investigating vulnerabilities in computer programs, it may be advantageous, upon encountering a condition ordinarily associated with a vulnerability, to be able to trace the origins of data associated with the condition. In one embodiment this is accomplished by running a program with a vulnerability on a virtual machine, and associating, with each user data item, metadata indicating the location in the data file of the user data item. Computed user data items, i.e., data items formed from user data items by one or more operations, are also associated with metadata, indicating that they are computed user data. To identify the user data that contributed to any computed user data item, the virtual machine is operated in reverse execution, e.g., previous states of the virtual machine are recreated, making it possible to identify the arguments for each operation that resulted in computed user data. When one or more of these arguments is itself computed user data, the reverse execution process may be repeated until all of the origins, in user data, of computed user data have been identified. This information may then be potentially used to modify the user data, e.g., the contents of a data file processed by the program, to exploit or test the vulnerability.

According to an embodiment of the present invention, there is provided a method for identifying the origins, in a user data source containing an ordered sequence of user data items, of an end result calculated, from the user data items and other data items, by a virtual machine executing on a computing device, the method including: retrieving a plurality of user data items from the user data source; associating with each of the plurality of user data items a location identifier identifying the location of the user data item in the sequence of user data items; executing a plurality of instructions with the virtual machine, each of the plurality of instructions taking one or more arguments and producing one or more results, associating with each result: the location identifier of the data item when one argument is a user data item; and a tag when more than one argument is a user data item; until the end result is obtained; stepping through instructions with the virtual machine in reverse order, taking results and producing arguments, and tracing the origin of a result associated with a tag to each of the user data items contributing to the result.

In one embodiment, the user data source is a generated data file.

In one embodiment, the generated data file is generated by pseudorandom modification of a retrieved data file.

In one embodiment, the executing of a plurality of instructions with the virtual machine includes periodically saving the state of the virtual machine.

In one embodiment, the stepping through instructions in reverse order includes returning to a previously saved state of the virtual machine and executing instructions with the virtual machine starting from the previously saved state.

In one embodiment, the method includes tracing the origins of the end result to each user data item contributing to the end result.

In one embodiment, the tracing of the origins of the end result to each end user data item contributing to the result includes recursively tracing the origins of each computed user data item contributing to the end result.

According to an embodiment of the present invention there is provided a system for identifying the origins, in a user data source containing an ordered sequence of user data items, of an end result calculated, from the user data items and other data items, by a virtual machine executing on a computing device, the system including: a processor; and a memory, wherein the memory has stored thereon instructions that, when executed by the processor, cause the processor to: retrieve a plurality of user data items from the user data source; associate with each of the plurality of user data items a location identifier identifying the location of the user data item in the sequence of user data items; execute a plurality of instructions with the virtual machine, each of the plurality of instructions taking one or more arguments and producing one or more results, associate with each result: the location identifier of the data item when one argument is a user data item; and a tag when more than one argument is a user data item; until the end result is obtained; step through instructions with the virtual machine in reverse order, taking results and producing arguments, and trace the origin of a result associated with a tag to each of the user data items contributing to the result.

In one embodiment, the user data source is a generated data file.

In one embodiment, the generated data file is generated by pseudorandom modification of a retrieved data file.

In one embodiment, the executing of a plurality of instructions with the virtual machine includes periodically saving the state of the virtual machine.

In one embodiment, the stepping through instructions in reverse order includes returning to a previously saved state of the virtual machine and executing instructions with the virtual machine starting from the previously saved state.

In one embodiment, the instructions cause the processor to trace the origins of the end result to each user data item contributing to the end result.

In one embodiment, the tracing of the origins of the end result to each end user data item contributing to the result includes recursively tracing the origins of each computed user data item contributing to the end result.

BRIEF DESCRIPTION OF THE DRAWINGS

Features, aspects, and embodiments are described in conjunction with the attached drawings, in which.

DETAILED DESCRIPTION

Figure 1:
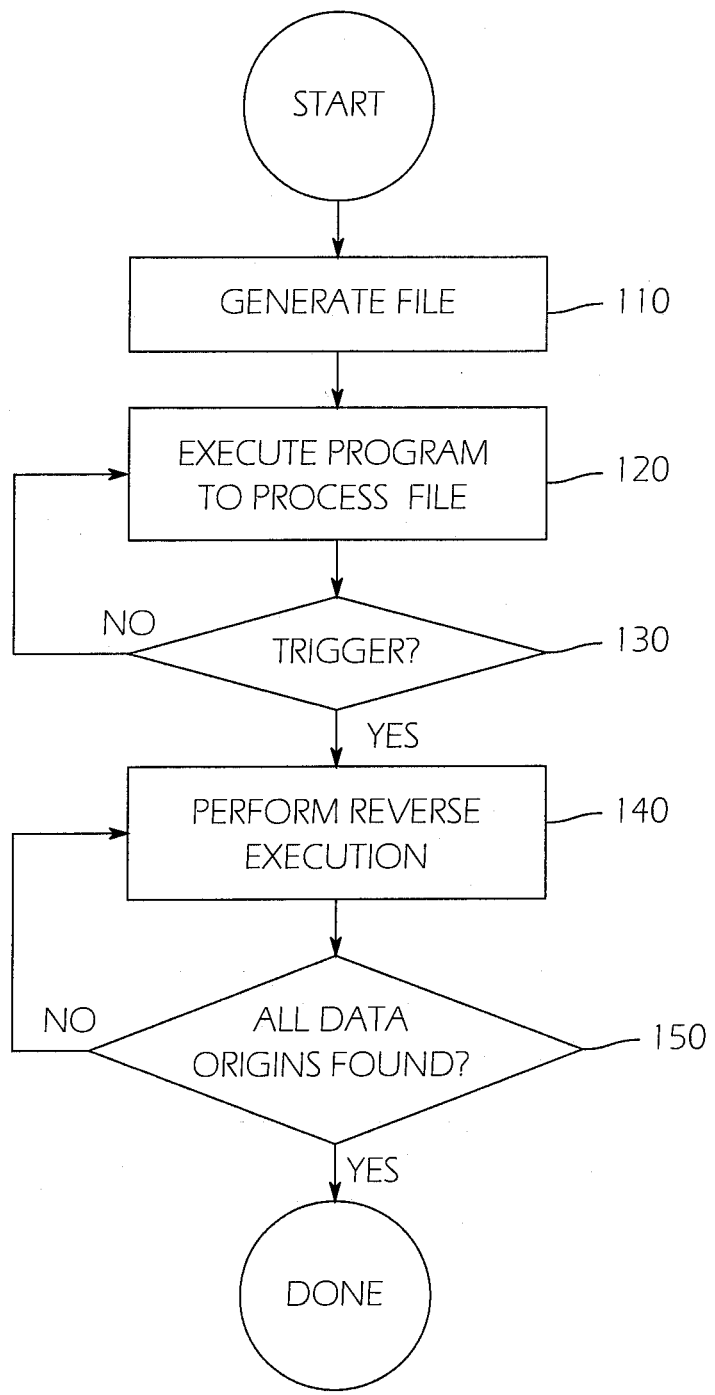
FIG. 1 is a flow chart of a method for automatic algorithm discovery using reverse dataflow analysis according to an embodiment of the present invention.

The detailed description set forth below in connection with the appended drawings is intended as a description of exemplary embodiments of a system and method for automatic algorithm discovery using reverse dataflow analysis provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In one embodiment of the present invention, the existence of a vulnerability in a program may first be detected by a process in which numerous files are processed by the program, while the program is running on a virtual machine. Running the program on a virtual machine makes it possible to monitor aspects of the operation and state of the virtual machine. This monitoring may indicate an abnormal condition resulting from a vulnerability in the program. For example, if during execution the return address from a subroutine is overwritten in its location on the stack, this overwriting may be an indication of abnormal execution, and of a vulnerability. As another example, a function pointer or a class object containing function pointers being read from uninitialized heap memory may be a vulnerability that may be exploited by initializing this region of heap memory with one or more pointers to executable user data, i.e., user data which when executed will take control of the machine.

A large set of candidate files for potentially triggering a vulnerability may be formed by searching the Internet for data files having an appropriate format, e.g., files created by others using the same program, and retrieving the files. Each file may then be processed, with a process referred to as fuzzing, in which pseudorandom changes are made to the file, to form a large number of derivative files. Such pseudorandom changes may include the flipping of randomly selected bits, deletion of randomly selected bytes, or insertion of pseudorandom bytes at randomly selected places in the file.

The collection of retrieved files and files generated by fuzzing may then be processed by the program on a virtual machine, while monitoring the execution for abnormal conditions indicative of a possible vulnerability. If such a vulnerability is detected, it may be advantageous to determine which data items, e.g., bytes, in the user data contributed to an end result involved in the vulnerability, e.g., a data value overwritten onto the return address. This may be accomplished by configuring the virtual machine to associate, with each data item processed, a metadata item containing information about the origin of the data item.

In other embodiments user data may be provided to the virtual machine from other sources than data files. The source may be configured by the operator of the virtual machine to be any source of user data, including but not limited to data files, network packets, or keyboard input. In each case the origin of a particular data item in the stream of data from the source may be identified, e.g., by the number of bytes preceding the particular data item in the stream of data from the source.

For this purpose, data items may be categorized into two categories, tagged data and untagged data, and the tagged data may be further categorized into user data and computed user data. An item of user data, which may be referred to as a user data item, is a data item obtained directly from the user, without subsequent processing, e.g., a byte read from a user data file. An item of computed user data, which may be referred to as a computed user data item, is a data item resulting from an operation, in which an argument to the operation was a user data item or a computed user data item. Untagged data includes all other data. Tagging computed user data as computed user data instead of maintaining, in corresponding metadata, a complete record of the origin of each user data item which contributed to the computed user data item, may result in significant memory savings, albeit at the expense of some increase in computational load.

For example if the data item was read from the file, i.e., it is a user data item, the metadata may contain the file name and the location in the file of the data item. If the data item is computed user data, then the metadata may contain only the file name to indicate that the data item is computed user data. When the data item is an untagged data item, the metadata may be empty or may indicate that the data item is an untagged data item.

Execution on the virtual machine may be performed one instruction at a time until the end result is obtained, i.e., an abnormal condition, which may be the result of a vulnerability, occurs. Some instructions may be operations, such as addition, subtraction, multiplication, or division, i.e., they may take arguments and generate results. Other instructions, such as a "NOP," which only advances the program counter, may not take arguments nor generate results.

As mentioned above, the overwriting of the return address on the stack, during subroutine execution, may be an example of an abnormal condition. Ordinarily when a subroutine is called, the return address is pushed onto the stack, and execution subsequently jumps to the first instruction of the subroutine. When the subroutine returns normally, execution jumps to the memory location identified by the return address. Thus, overwriting of the return address prior to return from the subroutine may be an abnormal event.

A user who wishes to exploit such an abnormal event as a vulnerability to take control of a computer may attempt to cause a particular data value to be overwritten onto the return address; this particular data value may for example point to other user data which would then be executed when the subroutine returns. For example, if the metadata associated with the data item overwritten onto the return address indicates that the data item was a user data item from a data file, then the user may determine, from the metadata, the origin in the data file, i.e., the location in the data file, of the user data item that was overwritten onto the return address, and the user may substitute a particular data value at that location in the data file, in an attempt to cause the particular data value to be overwritten onto the return address during subsequent execution in which this modified data file is processed.

In general, however, if the return address is overwritten, it may not be overwritten with user data, but with untagged data, or with computed user data resulting from a sequence of operations the arguments for some of which were user data items. In the latter case, i.e., if the return address is overwritten with computed user data, it may also be possible to create a modified file which, when processed by the program, results in a particular data value being overwritten over the return address. This may be accomplished by identifying, in the input file, all of the user data items that contributed, through the sequence of operations, to the end result, i.e., the data item overwritten onto the return address, and then changing one or more of the values of data items at those locations in the file, so that the result of the sequence of operations yields the particular data value.

In one embodiment, the user data items contributing to the end result are found using reverse execution. "Reverse execution," "stepping through instructions in reverse order," or "executing instructions in reverse order," as used herein means any process the result of which is to retrieve or reproduce a previous state of a real or virtual machine. In particular, reverse execution may be used to step backwards through the set of previously executed instructions, and to identify for each operation the arguments that were used to generate the result of the operation. During reverse execution, in one embodiment, at each operation, any argument that is user data is saved, along with its location, and any argument that is computed user data is further, e.g., recursively, traced back to its origins in user data.

Referring to FIG. 1, in one embodiment, the process of identifying a vulnerability and of identifying the source locations, in a data file, of user data associated with the vulnerability, may begin, in an act 110, of generating the user data file. This act 110 may include retrieving a number of data files, e.g., from the Internet, and fuzzing them. In an act 120, the program may be caused to execute on a virtual machine, to process the user data file. In an act 130, the state of the virtual machine may be checked, to determine whether a transition into an abnormal state, e.g., one in which the return address has been overwritten, has been triggered. If such a transition has not been triggered, forward execution continues; otherwise a phase of reverse execution is begun. Reverse execution is performed in act 140, and at each operation in the sequence of operations leading to the end result, each argument is handled according to whether it is untagged data, user data, or computed user data. Any untagged data item is disregarded. Any user data item is stored, along with a record of the operation in which it was used to generate an intermediate result. Computed user data is traced back, in reverse execution, for the purpose of identifying its origins in user data. The act 140 is repeated until, in act 150, it is determined that all of the origins, in user data, of the end result, have been identified.

Figure 2:
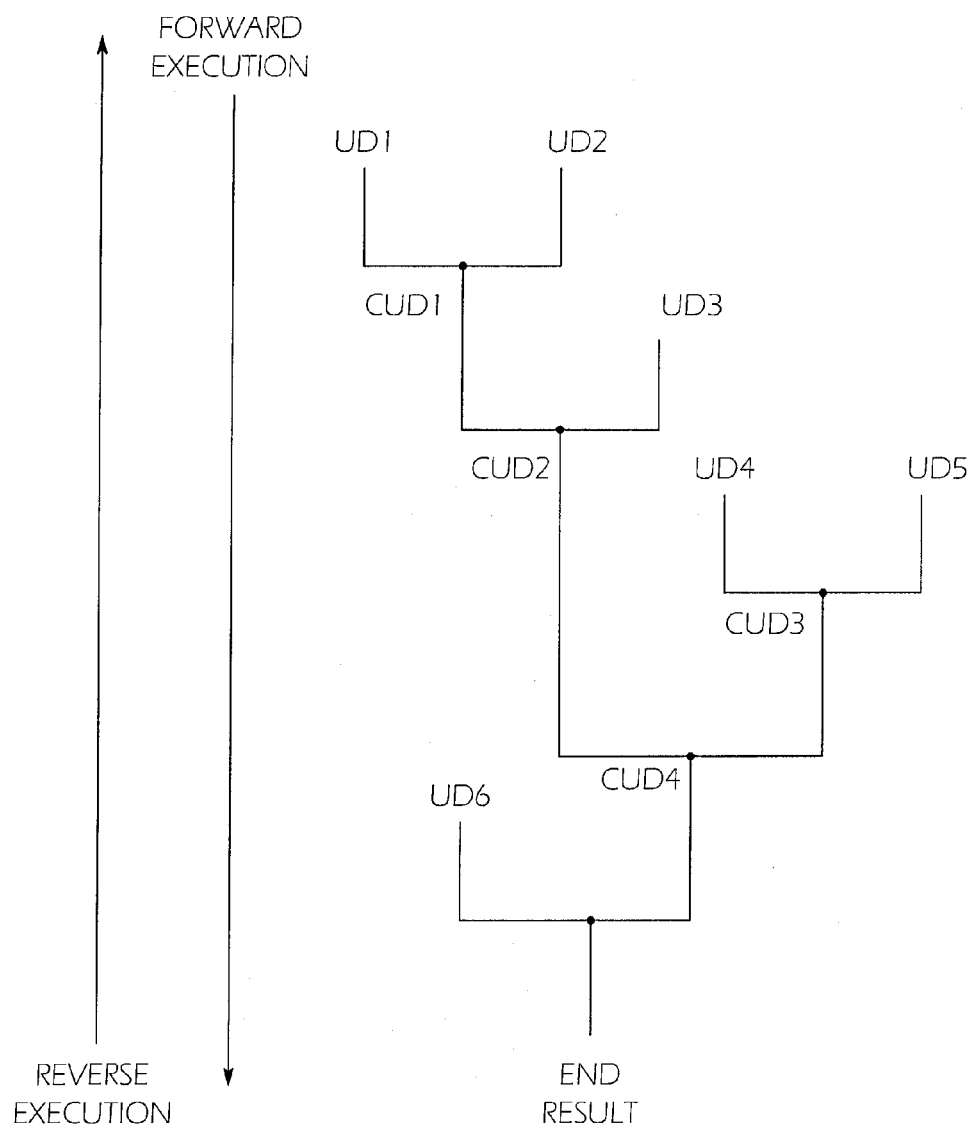
FIG. 2 is a data flow diagram showing an example of combinations of data items forming intermediate products and an end result, and recovery of user data items using reverse execution, according to an embodiment of the present invention.

Referring to FIG. 2, in one example, multiple pieces of user data UD1-UD6 are combined, over the course of several operations, and form the end result which may be the overwritten onto a return address. At a first operation first and second user data items UD1 and UD2 are combined to form a first computed user data item CUD1, which is combined, in a second operation, with a third user data item UD3 to form a second computed user data item CUD2. The second computed user data item CUD2 may be combined with a third computed user data item CUD3—the result of an operation combining user data items UD4 and UD5—to form a fourth computed user data item CUD4, which may be combined with a sixth user data item UD6 to generate the end result. This data flow may be represented as a tree structure, as in FIG. 2, with each leaf corresponding to a user data item. Other data, e.g., untagged data, may also act as input to some operations, and some operations may produce more than one result; these are not shown in FIG. 2. Moreover, in some cases a user data item may be used in more than one operation; this situation may be represented for example by a tree in which two leaves represent the same user data item.

Reverse execution then results, in one embodiment, in the reconstruction of the tree structure of FIG. 2, and the identification of each user data item and its location in the user data source, e.g., in the user data file. If the algorithmic relationship between the user data items and the end result corresponding to the sequence of operations in which each of the user data items contributes to the end result is not too complex, then it may be inverted, e.g., by inspection or by numerical search, to find a set of values for the user data items that will produce the desired end result, e.g., the particular value which may be an address of user data to be executed.

Various approaches are possible for the process of using reverse execution to identify the user data items contributing to the end result. For example, periodic snapshots of the system state may be taken during forward execution, each snapshot capturing the entire state of the virtual machine at the time of the snapshot. Subsequently, to perform reverse execution from a current state to return to a particular earlier state, the state of the last snapshot preceding the particular earlier state may be restored, and then forward execution from the snapshot may be used to advance the virtual machine to the particular earlier state.

During reverse execution, at each operation in the sequence of operations leading to the end result, various pieces of information may be stored, including the type of operation performed, and the values of the arguments and the result. The location identifier for each user data item is stored. Tracing back the origins of computed user data may be done one user data item at a time, e.g., in FIG. 2, when moving up the tree in the direction of reverse execution, the left branch of each operation may be followed first, until it terminates at an end user data item, and then tracing may return to the next lower point in the tree at which a computed user data item has not yet been traced back to its origins in user data items. A recursive algorithm may be used in this approach. In another embodiment, at each operation encountered during reverse execution, in the sequence of operations leading to the end result, all of the arguments may be stored in a suitable data structure for representing the data flow from user data items to computed user data and to the end result.

Although limited embodiments of a system and method for automatic algorithm discovery using reverse dataflow analysis have been specifically described and illustrated herein, many modifications and variations will be apparent to those skilled in the art. Accordingly, it is to be understood that the system and method for automatic algorithm discovery using reverse dataflow analysis employed according to principles of this invention may be embodied other than as specifically described herein. The invention is also defined in the following claims, and equivalents thereof.

What is claimed is:

1. A method for identifying origins, in a user data source containing an ordered sequence of user data items, of an end result calculated from the user data items, by a virtual machine executing on a computing device, the method comprising:

retrieving a plurality of user data items from the user data source;

associating with each of the plurality of user data items, a location identifier identifying a location of the user data item in the sequence of user data items;

executing a plurality of instructions with the virtual machine, each of the plurality of instructions taking one or more arguments and producing one or more results, associating with each result:

the location identifier of the user data item when one argument is a user data item; and a tag when more than one argument is a user data item; until the end result is obtained;

executing instructions with the virtual machine in reverse order, taking results and producing arguments, and tracing the origin of a result associated with a tag to each of the user data items contributing to the result.

2. The method of claim 1, wherein the user data source is a generated data file.

3. The method of claim 1, wherein the user data source is user keyboard input.

4. The method of claim 1, wherein the user data source is a source of network packets.

5. The method of claim 2, wherein the generated data file is generated by pseudorandom modification of a retrieved data file.

6. The method of claim 1, wherein the executing of a plurality of instructions with the virtual machine comprises periodically saving the state of the virtual machine.

7. The method of claim 6, wherein the executing instructions in reverse order comprises returning to a previously saved state of the virtual machine and executing instructions with the virtual machine starting from the previously saved state.

8. The method of claim 1, comprising tracing the origins of the end result to each user data item contributing to the end result.

9. The method of claim 8, wherein the tracing of the origins of the end result to each end user data item contributing to the result comprises recursively tracing the origins of each computed user data item contributing to the end result.

10. A system for identifying origins, in a user data source containing an ordered sequence of user data items, of an end result calculated, from the user data items, by a virtual machine executing on a computing device, the system comprising:

a processor; and a memory, wherein the memory has stored thereon instructions that, when executed by the processor, cause the processor to:

retrieve a plurality of user data items from the user data source;

associate with each of the plurality of user data items, a location identifier identifying a location of the user data item in the sequence of user data items;

execute a plurality of instructions with the virtual machine, each of the plurality of instructions taking one or more arguments and producing one or more results, associate with each result:

the location identifier of the user data item when one argument is a user data item; and a tag when more than one argument is a user data item; until the end result is obtained;

execute instructions with the virtual machine in reverse order, taking results and producing arguments, and trace the origin of a result associated with a tag to each of the user data items contributing to the result.

11. The system of claim 10, wherein the user data source is a generated data file.

12. The system of claim 11, wherein the generated data file is generated by pseudorandom modification of a retrieved data file.

13. The system of claim 10, wherein the executing of a plurality of instructions with the virtual machine comprises periodically saving the state of the virtual machine.

14. The system of claim 13, wherein the executing instructions in reverse order comprises returning to a previously saved state of the virtual machine and executing instructions with the virtual machine starting from the previously saved state.

15. The system of claim 10, wherein the instructions cause the processor to trace the origins of the end result to each user data item contributing to the end result.

16. The system of claim 15, wherein the tracing of the origins of the end result to each end user data item contributing to the result comprises recursively tracing the origins of each computed user data item contributing to the end result.

* * * * *